United States Patent
Brachert et al.

(10) Patent No.: US 7,347,180 B2
(45) Date of Patent: Mar. 25, 2008

(54) METHOD FOR OPERATING AN INTERNAL COMBUSTION ENGINE

(75) Inventors: Gots Brachert, Stuttgart (DE); Rüdiger Herweg, Esslingen (DE); Matthias Pfau, Ludwigsburg (DE); Jochen Schäflein, Stuttgart (DE); Hans-Jürgen Weimann, Oppenweiler (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 11/411,196

(22) Filed: Apr. 25, 2006

(65) Prior Publication Data
US 2006/0225693 A1  Oct. 12, 2006

Related U.S. Application Data
(63) Continuation-in-part of application No. PCT/EP2004/011517, filed on Oct. 14, 2004.

(30) Foreign Application Priority Data
Oct. 29, 2003 (DE) ............................ 103 50 798

(51) Int. Cl.
F02B 17/00 (2006.01)
F02B 47/08 (2006.01)
F02M 25/07 (2006.01)

(52) U.S. Cl. ........................ 123/295; 123/299

(58) Field of Classification Search ............. 123/299, 123/255, 294, 295, 300, 305, 90.15, 568.14
See application file for complete search history.

(56) References Cited

U.S. PATENT DOCUMENTS

| | | | |
|---|---|---|---|
| 6,105,550 A * | 8/2000 | Nieberding ............. | 123/294 |
| 6,213,086 B1 * | 4/2001 | Chmela et al. .......... | 123/276 |
| 6,386,177 B2 * | 5/2002 | Urushihara et al. ..... | 123/299 |
| 6,742,494 B2 * | 6/2004 | Unger et al. ............. | 123/305 |
| 6,860,244 B2 * | 3/2005 | Glugla et al. ............ | 123/78 E |
| 7,194,996 B2 * | 3/2007 | Koopmans ............... | 123/295 |
| 2002/0007816 A1 | 1/2002 | Loye et al. | |
| 2002/0040692 A1 | 4/2002 | LaPointe et al. | |

FOREIGN PATENT DOCUMENTS
DE   28 51 504    6/1980
JP   2001003771   1/2001

* cited by examiner

Primary Examiner—Willis R. Wolfe
Assistant Examiner—Johnny H. Hoang
(74) Attorney, Agent, or Firm—Klaus J. Bach

(57) ABSTRACT

In a method for operating an internal combustion engine having a variable compression ratio either in a compression ignition or in a spark ignition operating mode depending on the engine operating point, a higher compression ratio is provided in the compression ignition mode than in the spark ignition mode so as to optimize the operation of the internal combustion engine at low and medium engine loads, and to reduce engine emissions.

5 Claims, 2 Drawing Sheets

METHOD FOR OPERATING AN INTERNAL COMBUSTION ENGINE

This is a Continuation-in-Part Application of International Application PCT/EP2004/011517 filed 14 Oct. 2004 and claiming the priority of German application 103 50 798.1 filed 29 Oct. 2003.

BACKGROUND OF THE INVENTION

The invention relates to a method of operating an internal combustion engine in particular an auto-ignition internal combustion engine with direct fuel injection including a cylinder with a cylinder head having inlet and outlet valves and a piston movably disposed in the cylinder.

In direct-injection internal combustion engines with auto-ignition, lean homogeneous fuel/air mixtures are often made to auto-ignite so that high efficiency levels and improved exhaust emissions are obtained. In such internal combustion engines which are referred to as HCCI or PCCI internal combustion engines, that is, internal combustion engines with compression ignition, a lean basic mixture of air, fuel and retained exhaust gas is generally formed at partial load and auto-ignited. During full load engine operation, a stoichiometric mixture is frequently formed and spark ignited because, at high loads, steep rises in pressure could occur in the combustion chamber due to the auto-ignition which would adversely affect the operation of the engine.

According to the current state of the art, selective control of the compression ignition combustion described above can be achieved only with difficulty since the time of auto-ignition depends very greatly on the operating parameters of the engine and the ambient conditions. Furthermore, optimizing the combustion in terms of the exhaust gas temperatures can be made more difficult in particular as a result of the various features triggering the ignition. A better efficiency level is achieved however with compression ignition than with spark ignition.

It is the object of the present invention to provide a method of operating an internal combustion engine in which an operating mode which is optimized in terms of efficiency is ensured both in an auto-ignition mode and in a spark ignition mode.

SUMMARY OF THE INVENTION

In a method for operating an internal combustion engine having a variable compression ratio either in a compression ignition or in a spark ignition mode depending on the engine operating point, a higher compression ratio is provided in the compression ignition mode than in the spark ignition mode so as to optimize the operation of the internal combustion engine at low and medium loads, and to reduce engine emissions.

The method according to the invention is distinguished by the fact that exhaust gas is retained in the combustion chamber of the engine which is operated with compression ignition or with spark ignition depending on the engine operating point and a first fuel quantity is injected into the retained exhaust gas. A second fuel quantity is subsequently fed to the combustion chamber together with fresh combustion air, so that a homogeneous fuel/air mixture is formed in the combustion chamber. According to the invention, a higher compression ratio is set in the compression ignition mode than in the spark ignition mode. The compression ratio is preferably set by changing the volume of the combustion chamber.

In accordance with the present invention, a load-dependent compression ratio is provided for spatial ignition combustion so that an efficiency level which is optimized as a function of the load is obtained. Also, an optimum conversion rate of a catalytic converter, which is connected downstream, is achieved by providing a desired exhaust gas temperature. According to the present invention, high compression ratios can be set during the compression ignition mode, in particular for small and medium loads. The tendency of the internal combustion engine to knock is low by relatively low compression ratios during the spark ignition mode, which is employed in particular at high engine loads.

In one embodiment of the invention, during the compression ignition mode, a compression ratio between 10 and 20, in particular between 12 and 16 is set. In the compression ignition mode, the high compression ratio makes it possible to achieve the needed high temperature at the end of a compression stroke so that, in particular at low and medium loads, the conditions for triggering an auto-ignition are optimized. On the other hand, it may be necessary in the compression ignition mode, that the compression ratio is reduced in order to increase the exhaust gas temperatures, in particular in order to heat an exhaust gas catalytic converter to a specific operating temperature.

In a particular embodiment of the invention, a compression ratio between 8 and 12 is set during the spark ignition operating mode. This reduces a tendency of the internal combustion engine to knock, in particular in the full load operating mode.

According to a further embodiment of the invention, an auto-ignition time of the fuel/air mixture which is formed from the first and second fuel quantities is established during the compression ignition mode as a function of a quantity ratio of the first fuel quantity and the second fuel quantity. The quantity ratio of the first fuel quantity with respect to the second fuel quantity is 1:100 to 2:1 preferably 1:5 to 1:3.

The injection of the first fuel quantity into the retained exhaust gas brings about optimum homogenization or preconditioning of the first fuel quantity, which leads to an increase in mixture reactivity of the fuel/air mixture which is formed from the first and second fuel quantities. This favors the inception of the auto-ignition, in particular at operating points with a low exhaust gas temperature. The first fuel injection is preferably performed between the closing of an outlet valve and the opening of an inlet valve. Depending on the injection time of the first fuel quantity, the preconditioning effect can extend beyond pure homogenization. If, in particular, the fuel is injected into the retained exhaust gas before the top dead center position of the piston during a charge change, and the exhaust gas also contains residual air, conversion-like reactions can occur, by which the temperature of the mixture can be influenced, in particular, increased.

In a particular refinement of the invention, a main area of the combustion is established by injecting a third fuel quantity, after completion of the introduction of the second fuel quantity, and preferably before the piston reaches the top dead center position. The third fuel quantity is aimed at reducing the reactivity of the total cylinder charge in particular under high loads. This is intended to reduce high burning speeds and large pressure rises in the combustion chamber.

In a further refinement of the invention, the duration of the combustion is set as a function of the third fuel quantity and its injection time. With the reduction in the reactivity of the mixture which is brought about by the third fuel quantity the burning of the cylinder charge is slowed down so that, depending on the injection time of the third fuel quantity, the combustion period can be optimized as a function of the load.

Further features of the method according to the invention will become apparent from the following description of exemplary embodiments of the invention with reference to the accompanying drawings.

DESCRIPTION OF AN EXEMPLARY EMBODIMENT

An exemplary internal combustion engine with compression ignition comprises preferably four or more cylinders in each of which a piston is disposed in a longitudinally displaceable fashion and a combustion chamber is formed for the combustion of air with a fuel. The combustion chamber of the internal combustion engine is closed off at the top by a cylinder head, the piston delimiting the combustion chamber at the bottom. The internal combustion engine comprises, per combustion chamber, at least one inlet valve, at least one outlet valve, a fuel injector and an ignition source which is preferably a spark plug.

The internal combustion engine operates according to the 4-stroke principle, and it can be operated as a spark ignition engine, i.e. in a spark ignition mode or in an auto-ignition mode depending on the load point. In a four-stroke engine, a cycle includes four full strokes of the piston. The working cycle of the internal combustion engine corresponds to one combustion cycle, a combustion cycle starting with a first intake stroke beginning at a top dead center position of the piston from which the piston moves downwardly to the bottom dead center position. During the intake stroke, the combustion chamber is filled with combustion air, which is mixed with a specific quantity of exhaust gas retained in the combustion chamber during the exhaust stroke of a previous working cycle.

The method according to the invention is firstly aimed at optimizing the operation of the internal combustion engine by varying the compression ratio. The compression ignition is dependent, in particular, on the temperature level of the gas mixture during the compression and on the temperature reached at the end of the compression stroke. These variables can be influenced by means of the compression ratio. Furthermore, by varying the compression ratio, it is possible to optimize a rise in pressure in the cylinder owing to the combustion, and to optimize the exhaust gas emissions.

Figure 1:
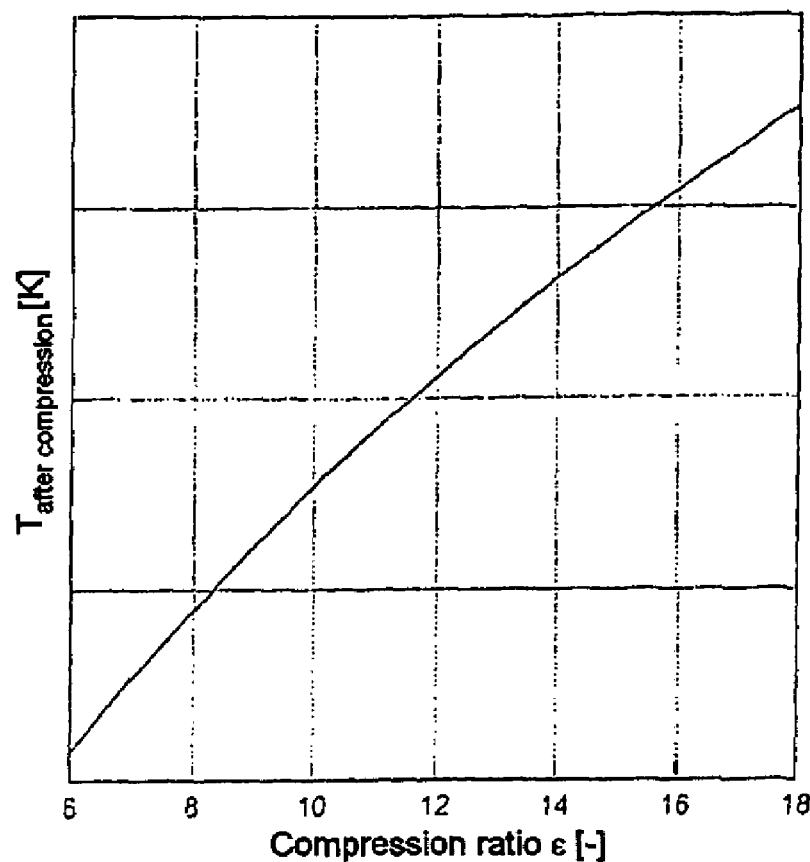
FIG. 1 shows a schematic profile of a cylinder charge temperature of an internal combustion engine according to the invention as a function of a compression ratio.
Figure 2:
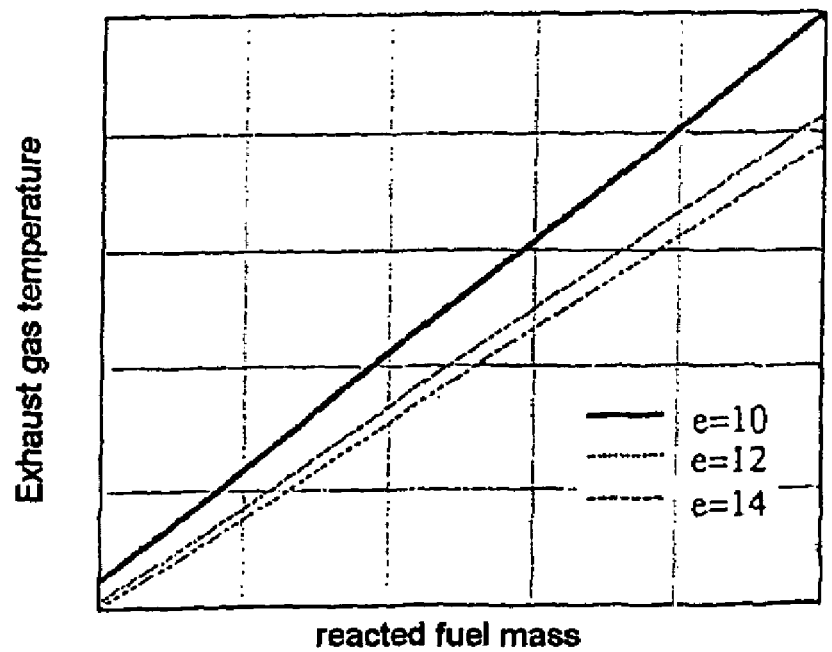
FIG. 2 shows an exhaust gas temperature profile of an internal combustion engine as a function of an operating point and a compression ratio.
Figure 4:
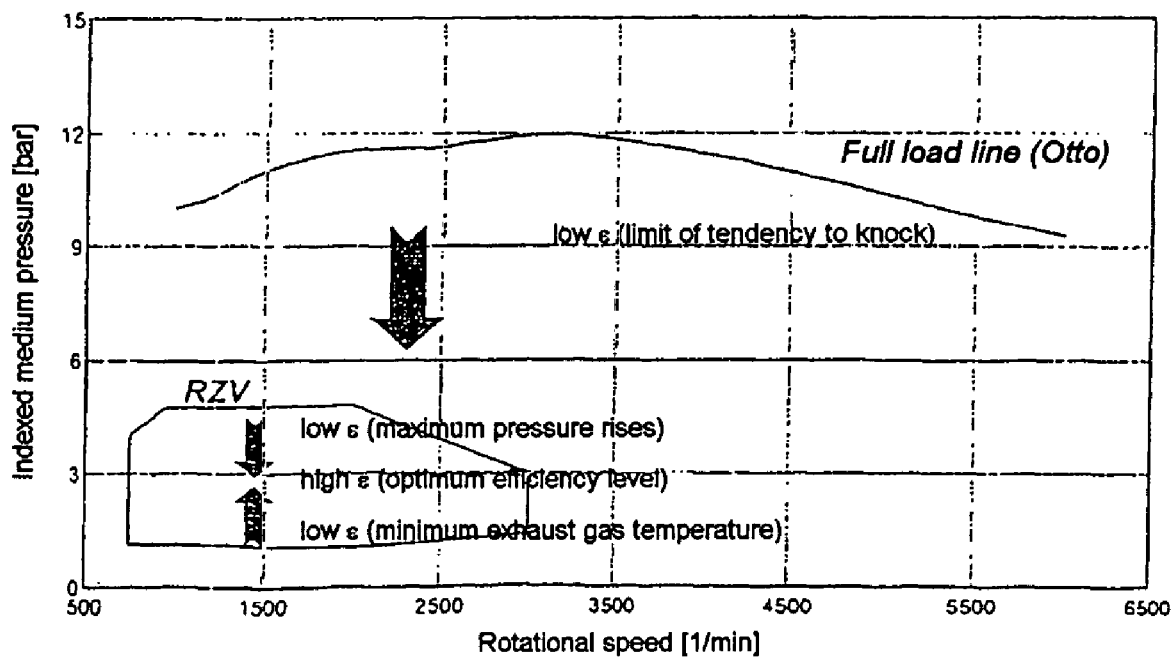
FIG. 4 shows a schematically an operating strategy according to the invention for setting a compression ratio as a function of an engine operating mode.

FIG. 1 illustrates the dependence of a cylinder charge temperature at the end of the compression stroke on the compression ratio. It becomes clear here how the temperature level rises as the compression ratio increases. According to the invention, a high compression ratio according to FIG. 4 is set at low and medium loads so that the conditions for triggering an auto-ignition can be optimized. At low loads, it is possible to set a lower compression ratio than the maximum acceptable compression ratio, in order to provide on a temporary basis or during a heat-up phase of the catalytic converter, an appropriate operating temperature for a downstream catalytic converter. FIG. 2 illustrates the dependence of the exhaust gas temperature on the current operating point and the compression ratio which has been set.

In accordance with FIG. 2, a load-dependent setting of the compression ratio is to be achieved. An operating strategy for achieving this goal is illustrated in FIG. 4. In this context, the compression ratio $\epsilon$ is adjusted as a function of the combustion mode which has been set. At small and medium loads, a compression ratio between 10 and 20, preferably between 12 and 16, is set during the compression ignition mode. The high compression ratio provides for a necessary temperature at the end of a compression stroke so that the conditions for triggering an auto-ignition are optimized. Alternatively, in the compression ignition mode, it is possible to reduce the compression ratio in order to increase the exhaust gas temperatures, in particular in order to heat an exhaust gas catalytic converter to a specific operating temperature. In contrast, according to FIG. 4, a compression ratio between 8 and 16, in particular between 8 and 12, is set during the spark ignition operating mode. This reduces a tendency of the internal combustion engine to knock, particularly under full load operating conditions.

Figure 3:
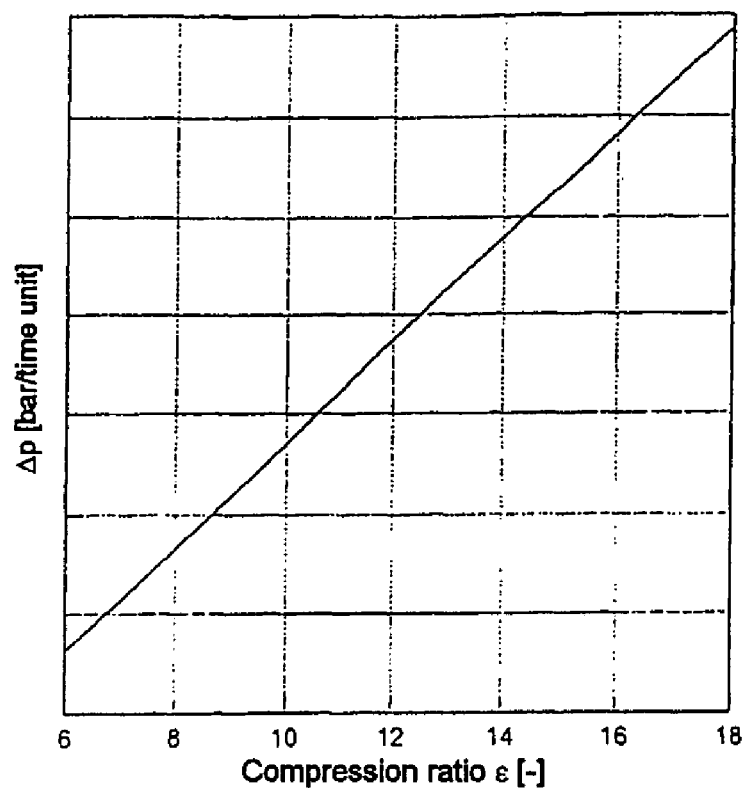
FIG. 3 shows a diagram of a cylinder pressure difference as a function of a compression ratio.

The internal combustion engine is optionally operated at high loads as a spark ignition engine, i.e. with spark ignition of the cylinder charge, particularly in the full load mode. According to the invention, a high compression ratio is avoided during the spark ignition engine mode since it causes excessively high rises in pressure, in particular for the same combustion speeds (cf. FIG. 3).

The compression ratio is preferably changed mechanically, i.e. the volume of the combustion chamber is changed depending on the load point. For this purpose, a large number of possibilities which have been tried in practice may be used for form a variable compression ratio. For example, a variable combustion chamber volume can be brought about by displacing the cylinder with the cylinder head. There are different possibilities for this. For example, a crankshaft which rotates in eccentric bearings could be used for changing the compression ratio. Here, by turning the eccentrics, the vertical position of the bearings can be changed so that the upper and lower dead center positions of the pistons are displaced. In this context, the displacement of a crankshaft axis can be compensated for at the control drive and power take-off. The mechanical implementation of a variable compression ratio is freely selectable and can be provided as desired.

According to the invention, during the compression ignition mode, a specific mixture reactivity of a fuel/air mixture which is formed from the first fuel quantity and a subsequent, second fuel quantity is provided by means of a first fuel injection which is injected into the combustion chamber which is filled with retained exhaust gas. In this way, closed-loop or open-loop control is carried out for the initiation of the auto-ignition. This is advantageous in particular at operating points with a low exhaust gas temperature since reliable operation of the internal combustion engine with compression ignition is made possible even in lower rotational speed and load ranges.

The first fuel quantity makes available a relatively large amount of energy or a relatively high temperature level for a subsequent main combustion, allowing energy loss due to the relatively small fuel quantity which is converted to be compensated when the engine is operated at low loads. As a result, the current operating range with compression ignition is made larger so that the exhaust gas emissions can be further reduced for example in the idling mode.

The first fuel injection is preferably performed between the closing of the outlet valve and the opening of the inlet valve. Alternatively, the first fuel quantity can be injected into the exhaust gas retained in the combustion chamber during the exhaust stroke of the internal combustion engine between the closing of the outlet valve and 270° Ca before a top dead center position of the piston.

Alternatively, the first fuel quantity can be injected into the combustion chamber in a range between the closing of the outlet valve and the top dead center position of the piston. As a result, conversion-like reactions during the first fuel injection are increased. The injection of the first fuel quantity leads to conversion-like reaction with which the final temperature of the mixture is influenced. As a result, the auto-ignition time is influenced. The first fuel quantity is preferably between 0% and 30% of the total fuel quantity, and the second fuel quantity can be between 40% and 100% of the total fuel quantity.

Introducing the second fuel quantity into the combustion chamber forms the main mixture which is compressed in the compression stroke. During the compression stroke, the piston moves upwardly from the bottom dead center position to the top dead center position of the piston. The main mixture is ignited in a region of the top dead center position of the piston. According to the invention, the auto-ignition time of the fuel/air mixture which is formed from the first and second fuel quantities can be set as a function of a quantity ratio of the first fuel quantity and the second fuel quantity. A particularly advantageous preconditioning of the main mixture occurs with a quantity ratio between 1:5 and 1:3. The second fuel quantity is preferably injected into the combustion chamber in a range between 300° Ca and 120° Ca before the top dead center position of the piston.

While the combustion of the main mixture is still occurring, the piston moves downwardly as far as to the bottom dead center position. The main combustion can be optimized according to the invention by means of an injection of a third fuel quantity. The third fuel quantity is optionally injected before or after the inception of the auto-ignition, preferably before the top dead center position of the piston so that the reactivity of the main mixture of the total cylinder charge can be reduced or changed. The third fuel injection can advantageously control the period of combustion as a function of its injection time and/or its quantity. As a result, a steep rise in pressure in the combustion chamber is prevented and lower exhaust emissions are thus obtained. The third fuel quantity is preferably between 10% and 30% of the total fuel quantity.

In the following exhaust cycle, the piston moves upwardly to the top dead center position of the piston and expels the exhaust gases from the combustion chamber. The outlet valve is opened during the exhaust stroke so that the exhaust gases are expelled from the combustion chamber. Early closing of the outlet valve causes a specific quantity of exhaust gas to be retained in the combustion chamber.

The inventive adjustment of the compression ratio in combination with the injection strategy according to the invention permits the internal combustion engine to be operated with compression ignition and with spark ignition in essentially all load ranged and with an optimized level of efficiency without misfiring occurring. The operation of an HCCI internal combustion engine at low loads is made possible, and the reduction in the compression ratio at high loads makes it possible to avoid steep rises in pressure and knocking in the spark ignition mode.

What is claimed is:

1. A method of operating an internal combustion engine with a variable compression ratio, said engine having a cylinder, a cylinder head including inlet and outlet valves, a piston movably disposed in the cylinder and defining a combustion chamber between the cylinder head and the piston, to which fresh air is supplied via an intake manifold, said method comprising the steps of operating the internal combustion engine in a compression ignition or in a spark ignition operating mode depending on the engine operating point, wherein, in a compression mode, exhaust gas is retained in the combustion chamber and compressed during a charge change, and a first fuel quantity is injected into the retained exhaust gas by means of a first injector arranged in the combustion chamber, a second fuel quantity is subsequently fed to the combustion chamber, and the compression ratio $\epsilon=(V_h+V_c)/V_c$ of the internal combustion engine is set higher in the compression ignition mode than in the spark ignition mode of operation, ($V_h+V_c$ being the cylinder volume when the piston is at the bottom of its stroke and $V_c$ being the cylinder volume when the piston is at the top of its stroke).

2. The method as claimed in claim 1, wherein a compression ratio between 10 and 20 is set during the compression ignition mode of engine operation.

3. The method as claimed in claim 1, wherein a compression ratio between 8 and 16 is set during the spark ignition mode of engine operation.

4. The method as claimed in claim 1, wherein an auto-ignition timing for the fuel/air mixture, which is formed from the first and second fuel quantities, is set as a function of a quantity ratio of the first fuel quantity and the second fuel quantity.

5. The method as claimed in claim 1, wherein a main area of combustion is established by injecting a third fuel quantity, which is carried out after the injection of the second fuel quantity ends and before the piston reaches its top dead center position and a period of combustion is set as a function of at least one of the third fuel quantity and the fuel injection timing.

* * * * *